United States Patent [19]
Ploenges

[11] 3,802,513
[45] Apr. 9, 1974

[54] TURF AERATING MACHINE
[75] Inventor: Ivan Ploenges, Mount Gambier, Australia
[73] Assignee: Scott Bonnar Limited, Thebarton, South Australia, Australia
[22] Filed: Sept. 27, 1972
[21] Appl. No.: 293,567

[30] Foreign Application Priority Data
Sept. 29, 1971 Australia.............................. 6469/71

[52] U.S. Cl.................................... 172/21, 172/95
[51] Int. Cl............................................. A01b 45/02
[58] Field of Search ............ 172/21, 22, 84, 91, 93, 172/95, 103; 111/89; 56/10.8

[56] References Cited
UNITED STATES PATENTS
2,206,264  7/1940  Rose .................................... 172/21
2,056,337  10/1936  Archibald ............................ 172/21
2,771,959  11/1956  Phelps ............................. 56/10.8 X FOREIGN PATENTS OR APPLICATIONS
661,287  11/1951  Great Britain ....................... 172/21
802,886  10/1958  South Africa ........................ 172/21

Primary Examiner—Stephen C. Pellegrino
Attorney, Agent, or Firm—Jay L. Chaskin, Esq.

[57] ABSTRACT

A turf aerating machine of the type wherein hollow tynes are driven into the turf successively, the tynes being carried on tyne holders which depend from eccentrics, each tyne holder being provided with spring means to urge it forwardly against a rubbing block, and the eccentrics being driven in the same direction as the wheels of the machine so that there is a minimum of tilting movement between the tynes and the ground during forward traverse of the machine while the tynes are driven into and lifted from the ground.

8 Claims, 6 Drawing Figures

TURF AERATING MACHINE

BACKGROUND OF THE INVENTION

This invention relates to a machine which is useful for aerating turf. Turf aerating machines are well-known and in common use, and the usual turf aerating machine employs a hollow tyne carried on a slide arrangement guided for vertical movement in a guide, the tyne being raised and lowered so as to penetrate the ground and punch holes therein. However, the slide is essentially spring loaded or cam operated, otherwise it continually moves forwardly with the machine as the machine is driven over the ground, and this would result in damage to the turf owing to the drag of the tyne in the ground. A typical arrangement of a tyne supporting slide is described and illustrated in the U.S. Pat. No. 2,800,066 (COHRS), and it is apparent from that description that the mechanism is somewhat complex in its construction, and the spring tension required to reposition the slide is such that some turf damage is substantially unavoidable. The U.S. Pat. Nos. 2,056,337 (ARCHIBALD), 2,236,562 (BRANDES) and 2,206,264 (ROSE) all describe devices wherein there is tilting of the tynes in the ground, or alternatieely cam means to limit such tilting. The U.S. Pat. No. 2,063,333 (NOLTE) describes a machine which remains stationary while the tynes enter and leave the ground. Such a machine would not damage the turf, but utilises a ratchet and crank arrangement, and is necessarily slower in operation than the machines described in the other said patents.

The main object of this invention is to provide a simple and inexpensive aerating machine wherein the tyne damage to turf is less than with the machines of the type described above, and wherein the cost of manufacture is also less.

BRIEF SUMMARY OF THE INVENTION

In general terms the invention relates to a turf aerating machine wherein hollow tynes depend from respective tyne holders journalled on eccentrics which are driven in the same direction as the wheels supporting the machine, so arranged that the tynes are driven into the ground and merely tilt as the machine moves forwardly.

More specifically, one form of the invention consists of a turf aerating machine having a chassis, ground engaging wheels supporting the chassis, transversely aligned bearings on the chassis, an eccentric carrying shaft journalled for rotation in the bearings, a plurality of eccentrics on the shaft, a plurality of tyne holders journalled for rotation on respective said eccentrics, a hollow tyne depending from each respective said tyne holder, a rotational driving power source on the chassis, and drive means coupling the power source to drive both the wheels and the eccentric carrying shaft in the same direction, so constructed and arranged that upon driving of the wheels the chassis moves in a forward direction and the tynes are successively driven into and remain in the ground during some forward travel of the machine. With this arrangement the tynes are tilted only slightly in a downward and rearward direction and as they enter the ground, and then tilted only slightly in a downward and forward direction as they leave the ground, this slight tilting accommodating the difference of travel from the eccentric and the machine. Damage to the turf is negligible, and at the same time the need for double eccentric control, subsidiary frames, slides and guides is removed. The tynes can conveniently be moved forwardly upon leaving the turf by means of springs which couple the tynes to the machine frame. In some forms of the machine, the eccentrics are circular rings surrounding a straight eccentric carrying shaft, while in other forms (not illustrated herein) the shaft is a crankshaft, the eccentrics being cranks.

An embodiment of the invention is described hereunder in some detail with reference to and is illustrated in the accompanying drawings, in which:-

FIG. 1 is a rear perspective view of a machine,

FIG. 2 a diagrammatic representation of a tyne about to enter the ground,

FIG. 3. a similar representation of the tyne in the ground,

Figure 1:
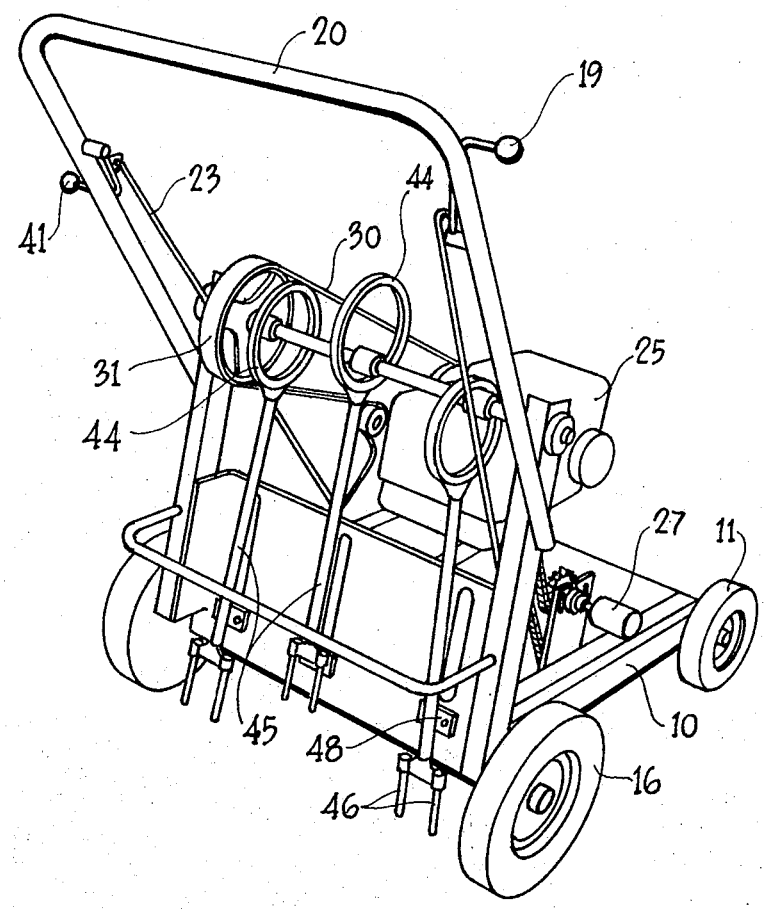
Figure 4:
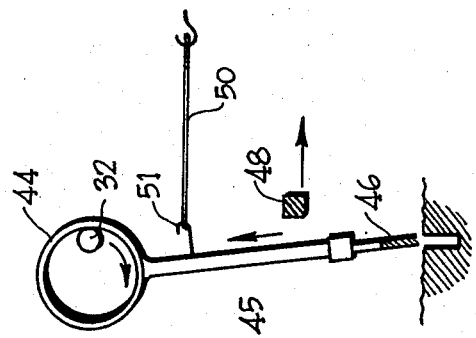
FIG. 4 is a similar representation of the tyne as it leaves the ground.
Figure 3:
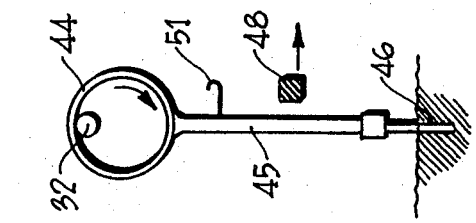
Figure 2:
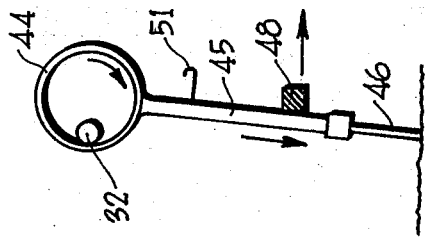

In this embodiment a chassis 10 is provided with two front ground engaging wheels 11 carried on a wheel shaft 12, and bearings in the chasis rotationally supporting the wheel shaft 12. The chassis 10 also pivotally supports an arm shaft 14 which carries on its ends respective arms 15 which themselves support rear wheels 16, journalled to rotate freely on respective stub axles 17. Pivotal movement of the shaft 14 is controlled by a wheel drive clutch lever 19 on a handle 20 which slopes upwardly and rearwardly from the chassis 10. The lever 19 is coupled to a control arm 22 on the shaft 14 by means of a link 23.

Figure 5:
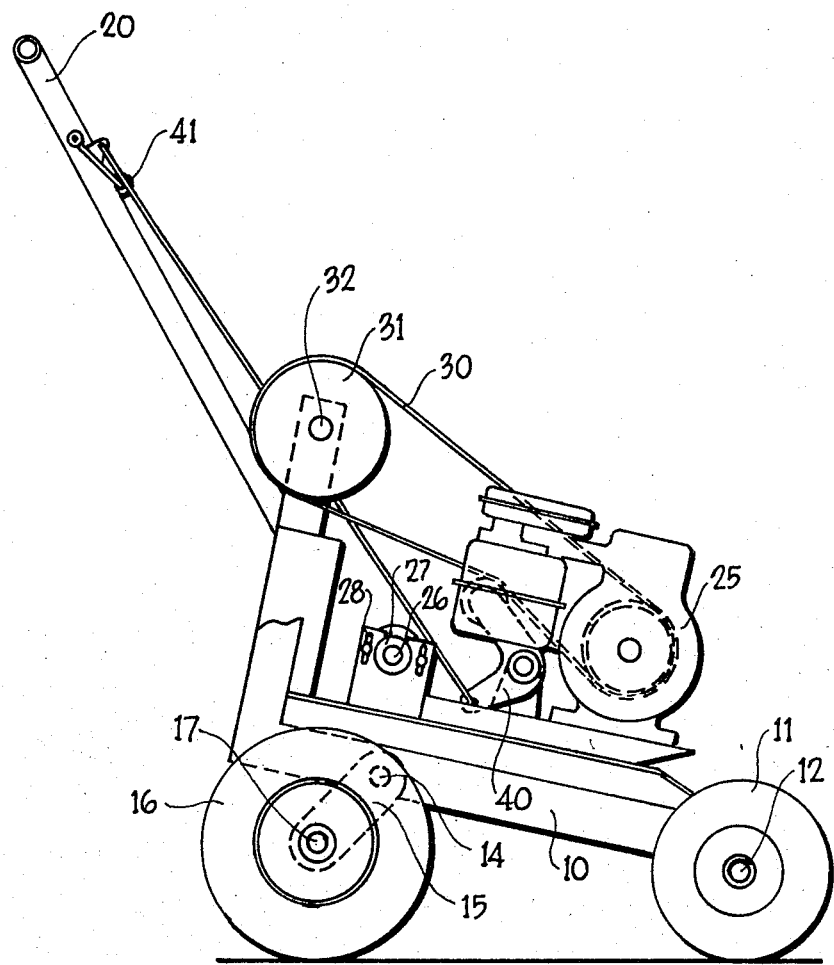
FIG. 5 is a partly sectioned elevational view illustrating a clutch arrangement.
Figure 6:
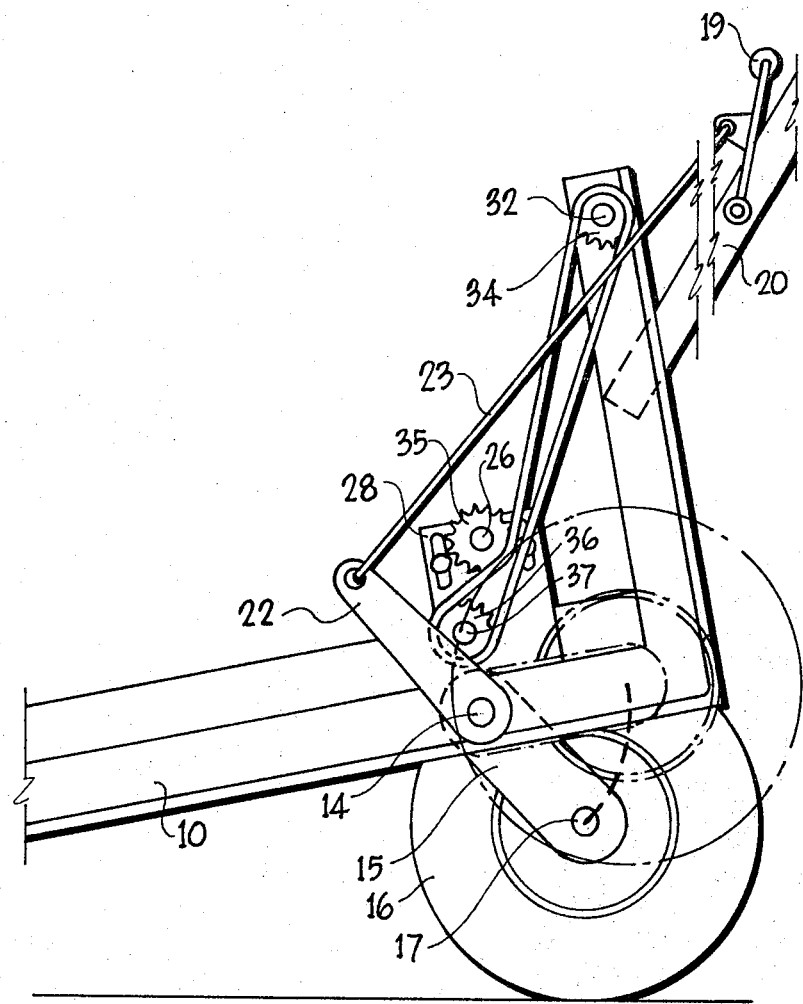
FIG. 6 is a fragmentary sectional elevation (drawn to an enlarged scale) showing the wheel drive mechanism.

The chassis 10 carries on it an engine 25, and drive means extend between the engine and a countershaft 26, the ends of which carry friction rollers 27 which frictionally engage the peripheries of the wheels 16 when the wheels are in their UP positions as shown in FIG. 5, to thereby effect drive to the wheels. The bearings (not shown) for the countershaft 26 are carried in bearing plates which are adjustable for height, in turn adjusting the relative positions of the chassis 10 and the rear wheels 16 when in their UP position, that is, adjusting depth of tyne penetration.

The engine 25 drives through a belt drive 30 onto a pulley 31 carried on an eccentric shaft 32 journalled in bearings (not shown) in the chassis 10, and a chain 33 extends around a sprocket 34 on shaft 32, over an arcuate portion of sprocket 35 on shaft 26, and around a sprocket 36 on a shaft 37 journalled in bearings in the chassis 10, for effecting drive to the countershaft 26 in a reverse direction from the direction of shaft 32 so that the rear wheels 16 are driven in the same direction. A belt tightening clutch generally designated 40 is controlled by a clutch lever 41 on handle 20 (FIG. 5).

The eccentric shaft 32 carries on it a series of eccentrics 44 (shown only in FIGS. 1 to 4), the eccentric shaft, as shown, being positioned some distance above the ground and rearwardly of the rear wheels 16. Each eccentric 44 has journalled on it the upper end of a tyne holder 45, the tyne holder being a depending member terminating in pairs of sockets each of which contains a hollow tyne 46. The tyne holder 45 normally wears against a rubber block 48, in this embodiment the rubber block 48 being formed of fabric reinforced rubber. A rubber band 50 (or an equivalent spring) applies a resilient force to the tyne holder 45, being coupled to a hook 51 thereon and also to the chassis of the machine and drawing the tyne holder into engagement with the rubber block 48, which, being resilient, absorbs impact. A guard (not shown) is positioned rearwardly of the tynes to protect operators from damage by the reciprocating tynes.

In operation the engine drives the wheels forwardly so that the chassis can proceed at a substantially uniform rate. At the same time when the eccentric shaft is rotating, the eccentrics move so that their lower traverse is rearward. The traverse of the eccentric of course is sinusoidal while the travel of the chassis is constant, and it therefore follows that there is a mismatch between the forward speed of the upper end of the tyne holder and the tyne which is in the lower end thereof. However, the resilient member holds the tyne holder against the rubber block at the time the tyne enters the ground so that the tyne slopes slightly rearwardly, and when the tyne leaves the ground it slopes slightly forwardly, this very small amount of rocking being all that is required to accommodate the difference between the sinusoidal and constant motions. Immediately the tyne is lifted from the ground, the resilient member draws the tyne holder forwardly so that it again rubs against the rubber block. This action may be delayed by simple cam means if required to avoid "skidding" over the turf.

A brief consideration of the above embodiment will indicate that the invention is very simple but results in an implement which is efficient and useful for aerating turf, while at the same time its cost of production is relatively small.

The above description discloses specific embodiments of the invention, however modifications and alternatives are possible. Therefore, the invention is not limited by the description and the scope thereof is determined by the appended claims.

I claim:

1. A turf aerating machine having a chassis, ground engaging wheels supporting the chassis, a single rotatable eccentric carrying shaft journalled to the chassis, plurality of eccentrics on the shaft, a plurality of tyne means journalled for rotation on respective eccentrics, drive means on the chassis for rotating both the wheels and the eccentric carrying shaft in the same direction, the tyne means being successively driven into and remain in the ground during some forward travel of the machine, wear means on the chassis for engaging each respective tyne means when each tyne means is about to enter the ground and resilient means for urging each respective tyne means towards the engaging means when each tyne means is driven into and leaves the ground.

2. A turf aerating machine according to claim 1 wherein the tyne means comprises tyne holder and a hollow tyne depending from the tyne holder.

3. A turf aerating machine according to claim 1 wherein the resilient means comprises a spring between each tyne means and the chassis.

4. A turf aerating machine according to claim 1 wherein the drive means comprises an engine and a belt drive which incorporates a clutch between the engine and the eccentric carrying shaft.

5. A turf aerating machine according to claim 1 wherein the drive means comprises an engine, a driven shaft carrying friction rollers on its ends coupling the engine to rear wheels, the friction rollers being frictionally engageable against the peripheries of the rear wheels to thereby impart drive to the rear wheels.

6. A turf aerating machine according to claim 5 comprising a chain coupling the engine to the rear wheels, means coupling the chain for the drive between the engine and a sprocket on the driven roller shaft, the chain extending part way around the periphery of the sprocket but being wholly disposed on one side of the roller shaft whereby the roller shaft rotates in a reverse direction from the direction of the rotation of the engine.

7. A turf aerating machine according to claim 5 further comprising an arm shaft pivotally supported by the chassis, arms on the ends of the arm shaft, aligned axles outstanding from respective arms, the rear wheels being rotatable on respective said aligned axles, and control means carried by the chassis and coupled to the arm shaft constructed and arranged to pivot the arm shaft and thereby either engage or disengage the rear wheels from the friction rollers to in turn either engage or disengage drive to the rear wheels.

8. A turf aerating machine according to claim 5 further comprising plates, means securing the plates to the chassis for adjusting the height of the rear wheels, bearings on the plates, said friction roller shaft being journalled in the bearings, said friction rollers abutting the rear wheels above their respective axes of rotation.

* * * * *